United States Patent [19]
Walker

[11] Patent Number: 5,943,418
[45] Date of Patent: Aug. 24, 1999

[54] RING-TRIP CIRCUIT

[75] Inventor: Herbert M. Walker, Greensboro, N.C.

[73] Assignee: Harris Corporation, Melbourne, Fla.

[21] Appl. No.: 08/764,487

[22] Filed: Dec. 12, 1996

[51] Int. Cl.$^6$ ...................................................... H04M 3/00
[52] U.S. Cl. ........................... 379/382; 379/350; 379/373; 379/377
[58] Field of Search ..................... 379/382, 377, 379/399, 373, 379, 418, 350, 242, 251, 252, 179, 181, 29; 327/413

[56] References Cited

U.S. PATENT DOCUMENTS

| | | | |
|---|---|---|---|
| 447,675 | 5/1891 | Arnsten et al. | 379/382 |
| 3,941,939 | 3/1976 | Holmes et al. | 379/382 |
| 4,484,105 | 11/1984 | Kriete et al. | 315/133 |
| 4,852,152 | 7/1989 | Honick | 379/413 |

FOREIGN PATENT DOCUMENTS

| | | |
|---|---|---|
| 0 227 186 | 1/1987 | European Pat. Off. . |
| 0 756 413 A1 | 1/1997 | European Pat. Off. . |

Primary Examiner—Forester W. Isen
Assistant Examiner—Jacques M. Saint-Surin
Attorney, Agent, or Firm—Charles E. Wands

[57] ABSTRACT

A ring-trip circuit monitors the voltage developed across a source resistor coupled to one of the leads of the subscriber line circuit, regardless of the ringing frequency of the ringing voltage applied to the line circuit, and irrespective of the polarity of the DC loop current developed in the line. In response to detecting a prescribed threshold level of the source resistor voltage—indicating that the customer has answered the call, the ring-trip circuit provides a digital output that is read by the control equipment of the central office to terminate the ringing voltage.

2 Claims, 1 Drawing Sheet

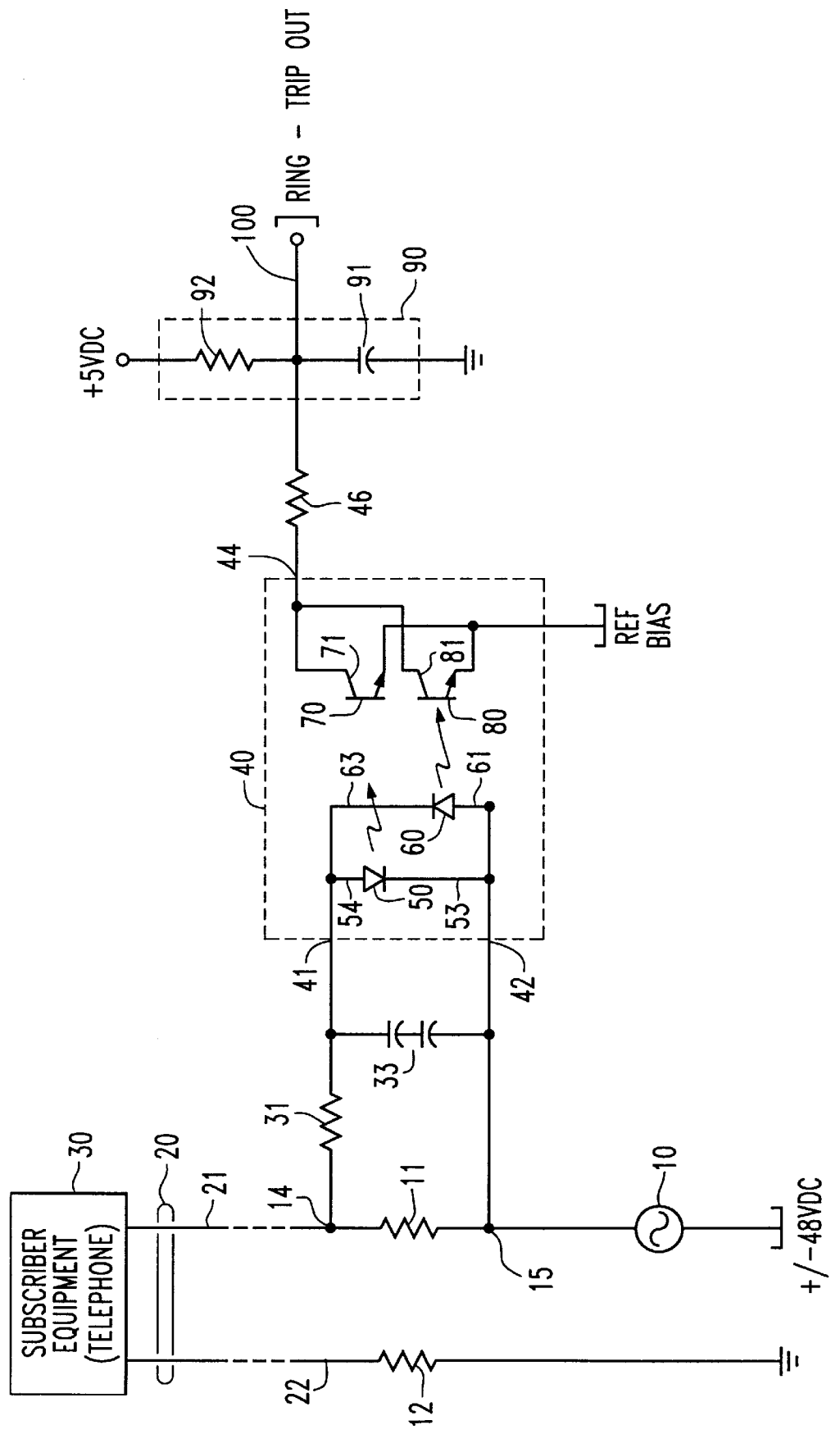

RING-TRIP CIRCUIT

FIELD OF THE INVENTION

The present invention relates in general to telephone circuits, and is particularly directed to a new and improved ring-trip circuit, that is installable in the central office of a telephone service provider and is operative to monitor a line circuit in the presence of ringing voltage, regardless of the ringing frequency of the ringing voltage, and irrespective of the polarity of the DC loop current. In response to the monitored line voltage reaching a prescribed threshold, which indicates that the customer has answered the call, the ring-trip circuit of the invention generates a digital ring-trip indication signal for terminating the ringing voltage.

BACKGROUND OF THE INVENTION

In order to cause a piece of subscriber equipment (e.g., telephone) to ring, thereby indicating the presence of an incoming call, an AC (ringing) voltage, which rides on a prescribed DC bias (+/−48 VDC) is customarily applied to the customer's line circuit from a ringing generator installed in the telephone central office. Termination of the ringing voltage, in response to detecting that the customer has answered the call, is termed ring-trip. The magnitude of the ringing voltage may vary over a substantial range (e.g., 70–140 VRMS) and the frequency of the ringing voltage may lie in a range of from 16–66 Hz. The loop current through the line may vary from twenty milliamps for a long line circuit up to one hundred milliamps for a short line circuit.

Due to these substantial parameter and polarity variations, currently commercially employed subscriber line circuit interface chips typically employ high precision components, whose values must be tailored in accordance with the length of the line circuit and the magnitude and frequency of the ringing voltage. Moreover, since such circuits employ a ground reference, they require additional components to protect the chip from line fault voltages. Other forms of ring-trip circuits use expensive, custom wound relay coils, which require associated resistor and capacitor components that are selected according to the length of the line circuit and the frequency of the ringing voltage.

SUMMARY OF THE INVENTION

In accordance with the present invention, the above-described drawbacks of conventional ring-trip circuits are effectively obviated by means of a new and improved ring-trip circuit, that monitors the voltage developed across a source resistor coupled to one of the leads of the subscriber line circuit, regardless of the ringing frequency of the ringing voltage applied to the line circuit, and irrespective of the polarity of the DC loop current developed in the line. In response to the source resistor voltage exceeding a prescribed threshold—indicating that the customer has answered the call, the ring-trip circuit changes the state of a digital ring-trip output lead for terminating the ringing voltage.

For this purpose, one end of the monitored source resistor is coupled through a scaling input resistor to a first input port of an dual polarity sensing opto-coupler. A second end of the monitored source resistor is coupled to a second input port of the opto-coupler. The opto-coupler serves to isolate a ring-trip output line from fault voltages that may be impressed across the monitored source resistor. The opto-coupler responds to both positive and negative DC voltages across the monitored source resistor, and can therefore be used without regard to the polarity of the DC bias voltage (+/−48 VDC) of the ringing generator. An input capacitor is coupled across the input ports and forms a voltage divider with the input resistor, so as to couple a fraction of the DC voltage drop across the monitored source resistor to the input ports of the opto-coupler, while effectively by-passing AC voltage variations from the opto-coupler.

The opto-coupler's output port is coupled to an output AC filter comprised of an output capacitor and an output/bias resistor. The output capacitor is coupled between ground and the ring-trip output line. The output/bias resistor is connected between a source of DC bias voltage and the ring-trip output line. The output AC filter effectively prevents the opto-coupler's output from changing state or oscillating in the presence of AC (ringing) current flow through the monitored source resistor, when the phone is answered.

With a ringing generator in the central office asserting a ringing voltage onto the customer's line, there is no loop current flow through the sense resistor until the customer goes off-hook. When the customer answers the phone, closing the local loop through the tip and ring leads, a DC current flows through the line circuit's source resistors. The resulting DC voltage across the source resistor monitored by the ring-trip circuit of the invention is applied across the input ports of the opto-coupler.

When the monitored DC voltage exceeds the turn-on threshold of one of its opto-electronic converters, the voltage at the opto-coupler's output port, which is coupled through the output AC filter to the ring-trip output line, changes state from a NO ANSWER condition to a ANSWER condition. In response to this change in state of voltage on the ring-trip output line, the ringing generator control circuitry of the central office terminates the application of the ringing voltage to the customer's line by the ringing generator.

BRIEF DESCRIPTION OF THE DRAWINGS

The single FIGURE schematically illustrates a ring-trip circuit according to the present invention.

DETAILED DESCRIPTION

A preferred embodiment of the ring-trip circuit according to the present invention is schematically illustrated in FIG. 1 as comprising a first source resistor 11, which is coupled in circuit between a ringing generator 10 and a first (ring) line portion 21 of a customer's line circuit 20, to which subscriber equipment such as a telephone 30 is connected, and a second source resistor 12, which is coupled in circuit between a source of reference potential (ground) and a second (tip) line portion 22 of the customer's line circuit 20. Source (or sense) resistors 11 and 12 are typically valued at 100 ohms each. Ringing generator 10 may impart either a positive or negative (+/−48 VDC) bias to the customer's line. As pointed out above, the ringing voltage imparted by the ringing generator typically has an amplitude in a range of from 70–140 VRMS and a frequency in a range of from 16–66 Hz. The DC current through the line may vary from twenty milliamps for a long line circuit to one hundred milliamps for a short line circuit.

A first, customer end 14 of the first source resistor 11 is coupled through an input resistor 31 (such as a 3.01K ohm resistor), which scales the voltage across the source resistor 11 to a first input port 41 of an opto-coupler 40. A second, office end 15 of the first source resistor 11 is coupled to a second input port 42 of opto-coupler 40. An input capacitor, such as a pair of series-connected 100 microfarad capacitors 33, is coupled across input ports 41 and 42 of opto-coupler 40. The input resistor 31 and input capacitor 33 form a voltage divider, which couples a portion of the DC voltage drop across the source resistor 11 to the input ports of the opto-coupler 40, but effectively by-passes AC voltage variations, so that AC voltages are blocked from reaching the opto-coupler. Since the ring-trip detector is coupled across the source resistor 11 and does not employ a ground reference, it enjoys reduced sensitivity to fault voltages that may appear on the customer's line circuit 20.

Opto-coupler 40, which serves to isolate a (digital) ring-trip output line 100 from any fault voltages that may be impressed across the first source resistor 11. Opto-coupler 40 may comprise a Hewlett Packard HCPL-2731 opto-coupler unit, as a non-limiting example, containing a pair of reverse-parallel connected light emitting diodes (LEDs) 50 and 60, that are coupled across input ports 41 and 42. LED 50 has its anode 51 coupled to the opto-coupler's first input port 41 and its cathode 53 coupled to the opto-coupler's second input port 42, while LED 60 has its anode 61 coupled to the opto-coupler's second input port 42 and its cathode 63 coupled to the opto-coupler's first input port 41.

Opto-coupler 40 further includes a pair of bipolar transistor-configured opto-electronic converters 70 and 80 having their respective base-sense junction areas optically coupled to LEDs 50 and 60, their respective collectors 71 and 81 coupled to opto-coupler output port 44 and their emitters coupled to a reference bias source (e.g., ground (GND)). Thus, the opto-coupler will respond to both positive and negative DC voltages across the source resistor 11, and can therefore be used without regard to the polarity of the DC bias voltage (+/−48 VDC) of the ringing generator 10.

The output port 44 of the opto-coupler 40 is coupled through a relatively low valued (e.g., 100 ohms) output coupling resistor 46 to an output filter 90 comprised of an output capacitor 91 and an output/bias resistor 92. Output capacitor 91, which may comprise a ten microfarad capacitor, as a non-limiting example, is coupled between ground (GND) and a digital ring-trip output line 100, to which the output coupling resistor 46 from the opto-coupler 40 is connected. Output/bias resistor 92, which may comprise a 47.5K ohm resistor, as a non-limiting example, is connected between a source of DC bias voltage (e.g., +5 VDC) and digital ring-trip output line 100. Output capacitor 91 and output resistor 92 thus form an AC filter that prevents the opto-coupler's output from changing state or oscillating in the presence of AC (ringing) current flow in the source resistor 11, when the phone is answered.

OPERATION

In operation, with a ringing generator in the central office asserting a ringing voltage onto the customer's line, there is initially no loop current flowing through the first source resistor 11. This condition is maintained until the customer goes off-hook. When the customer answers the phone, the local loop through the tip and ring leads of the line circuit 20 is closed so that, a DC current flows through the line circuit's source resistors 11 and 12. The resulting DC voltage across the source resistor 11 is applied across the input ports 41 and 42 of the opto-coupler 40.

When the monitored DC voltage across sense resistor 11 exceeds the turn-on threshold of one of its opto-electronic converters 70 and 80, rendering that converter conductive, the voltage at the opto-coupler's output port 44 changes state from a first (NO ANSWER) condition, to a second (ANSWER) condition, indicating that the call has been answered, so that the ringing voltage is to be terminated. In response to this change in state of voltage on the ring-trip output line 100, the ringing generator control circuitry of the central office terminates the application of the ringing voltage to the customer's line by the ringing generator 10.

As will be appreciated from the foregoing description, the previously described frequency and line length dependency drawbacks of conventional ground-referenced ring-trip circuits are effectively obviated by the ring-trip circuit of the present invention, which is operative to monitor the voltage developed across a source resistor coupled to one of the leads of the subscriber line circuit, regardless of the ringing frequency of the ringing voltage applied to the line circuit, and irrespective of the polarity of the DC loop current developed in the line. In response to detecting a prescribed threshold change in the source resistor voltage, indicating that the customer has answered the call, the ring-trip circuit provides a digital output that is read by the control equipment of the central office to terminate the ringing voltage.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A ring-trip circuit having a digital output port, which changes state for terminating application of a ringing voltage to a line circuit, in response to subscriber equipment coupled to said line circuit answering a call, said line circuit having a source resistor coupled therewith, said ring-trip circuit comprising:

a line-monitoring circuit which, in the presence of said ringing voltage, monitors the voltage developed across said source resistor as a result of DC loop current therethrough when said call is answered, irrespective of the polarity of said DC loop current, and is operative to generate a first signal representative of DC loop current through said first resistor exceeding a prescribed threshold, indicating that said call has been answered; and an output circuit coupled between said line-monitoring circuit and said a digital output port, and being operative to change the electrical state of said digital output port in response to said line-monitoring circuit detecting said DC loop current through said source resistor in excess of said prescribed threshold, indicating that said call has been answered, wherein said line-monitoring circuit is configured to monitor said source resistor over a multi-frequency range of variation of said ringing voltage applied to said line circuit, wherein said line-monitoring circuit comprises a dual polarity opto-coupler, and wherein a first end of said source resistor is coupled through an input resistor to a first input port of said dual polarity opto-coupler, and a second end of said source resistor is coupled to a second input port of said opto-coupler, further including an input capacitor coupled across said first and second input ports of said opto-coupler and forming a voltage divider with said input resistor, so that a portion of DC voltage across said source resistor is coupled to said opto-coupler, while AC voltage variations are by-passed from said opto-coupler wherein said dual polarity opto-coupler comprises a pair of opto-couplers having a pair of light emitting diodes wired in antiparallel.

2. A ring-trip circuit according to claim 1, wherein said opto-coupler has an output port coupled to an output which effectively prevents an output of said opto-coupler output from oscillating in the presence of ringing current flow through said source resistor.

* * * * *